(12) United States Patent
Tatsuta et al.

(10) Patent No.: US 10,852,695 B2
(45) Date of Patent: Dec. 1, 2020

(54) IMAGE PROCESSING APPARATUS, METHOD OF IMAGE PROCESSING, AND IMAGE PROCESSING SYSTEM

(71) Applicant: SONY CORPORATION, Tokyo (JP)

(72) Inventors: Hirokazu Tatsuta, Kanagawa (JP); Takeshi Kunihiro, Kanagawa (JP); Suguru Dowaki, Kanagawa (JP); Eriko Matsui, Tokyo (JP)

(73) Assignee: SONY CORPORATION, Tokyo (JP)

( * ) Notice: Subject to any disclaimer, the term of this patent is extended or adjusted under 35 U.S.C. 154(b) by 44 days.

(21) Appl. No.: 16/073,500

(22) PCT Filed: Feb. 3, 2017

(86) PCT No.: PCT/JP2017/004088
§ 371 (c)(1),
(2) Date: Jul. 27, 2018

(87) PCT Pub. No.: WO2017/141741
PCT Pub. Date: Aug. 24, 2017

(65) Prior Publication Data
US 2019/0049897 A1 Feb. 14, 2019

(30) Foreign Application Priority Data
Feb. 16, 2016 (JP) .................. 2016-026758

(51) Int. Cl.
*G03H 1/04* (2006.01)
*G03H 1/08* (2006.01)
(Continued)

(52) U.S. Cl.
CPC ....... *G03H 1/0443* (2013.01); *G01N 15/1463* (2013.01); *G03H 1/0866* (2013.01);
(Continued)

(58) Field of Classification Search
CPC .................. G03H 1/0443; G03H 1/0866
See application file for complete search history.

(56) References Cited

U.S. PATENT DOCUMENTS 10,108,143 B2 * 10/2018 Rhee ................. G06F 3/011
2010/0060551 A1 * 3/2010 Sugiyama ............ G02B 26/06
345/8

(Continued)

FOREIGN PATENT DOCUMENTS

CN 105378052 A 3/2016
EP 3009501 A1 4/2016
(Continued)

OTHER PUBLICATIONS

Mudanyali, et al., "Compact, Light-Weight and Cost-Effective Microscope Based on Lensless Incoherent Holography for Telemedicine Applications", Lab Chip 2010, Jun. 7, 2010, 25 pages.
(Continued)

*Primary Examiner* — John J Lee
(74) *Attorney, Agent, or Firm* — Chip Law Group

(57) ABSTRACT

There is provided an image processing apparatus including a motion detector that detects motion of an observation target from a hologram of the observation target, a hologram processing unit that extracts a portion of the hologram based on a result obtained by detecting the motion of the observation target, and a reconstruction unit that reconstructs an image from a portion of the extracted hologram.

20 Claims, 18 Drawing Sheets

(51) Int. Cl.
*G06T 7/215* (2017.01)
*G01N 15/14* (2006.01)
*G06T 19/20* (2011.01)

(52) U.S. Cl.
CPC .............. *G06T 7/215* (2017.01); *G06T 19/20* (2013.01); *G06T 2200/04* (2013.01); *G06T 2207/10056* (2013.01); *G06T 2207/30024* (2013.01)

(56) References Cited

U.S. PATENT DOCUMENTS

| | | | |
|---|---|---|---|
| 2012/0148141 A1* | 6/2012 | Ozcan | G06K 9/0014 382/133 |
| 2013/0258091 A1 | 10/2013 | Ozcan et al. | |
| 2015/0204773 A1 | 7/2015 | Ozcan et al. | |
| 2016/0163044 A1 | 6/2016 | Kunihiro et al. | |

FOREIGN PATENT DOCUMENTS

| | | |
|---|---|---|
| EP | 3126818 A1 | 2/2017 |
| JP | 5772817 B2 | 9/2015 |
| WO | 2012/082776 A2 | 6/2012 |
| WO | 2014/012031 A1 | 1/2014 |
| WO | 2015/008682 A1 | 1/2015 |
| WO | 2015/150589 A1 | 10/2015 |

OTHER PUBLICATIONS

Kim, et al., "A Cell-Based Biosensor for Real-Time Detection of Cardiotoxicity using Lensfree Imaging", Lab Chip, 2011, pp. 1801-1807.

Kim, et al, "A Cell-based Biosensor for Real-time Detection of Cardiotoxicity Using Lensfree Imaging", Lab Chip, vol. 11, Issue 10, Apr. 11, 2011, pp. 1801-1807.

International Search Report and Written Opinion of PCT Application No. PCT/JP2017/004088, dated Apr. 19, 2017, 14 pages of ISRWO.

* cited by examiner

[Fig. 1]
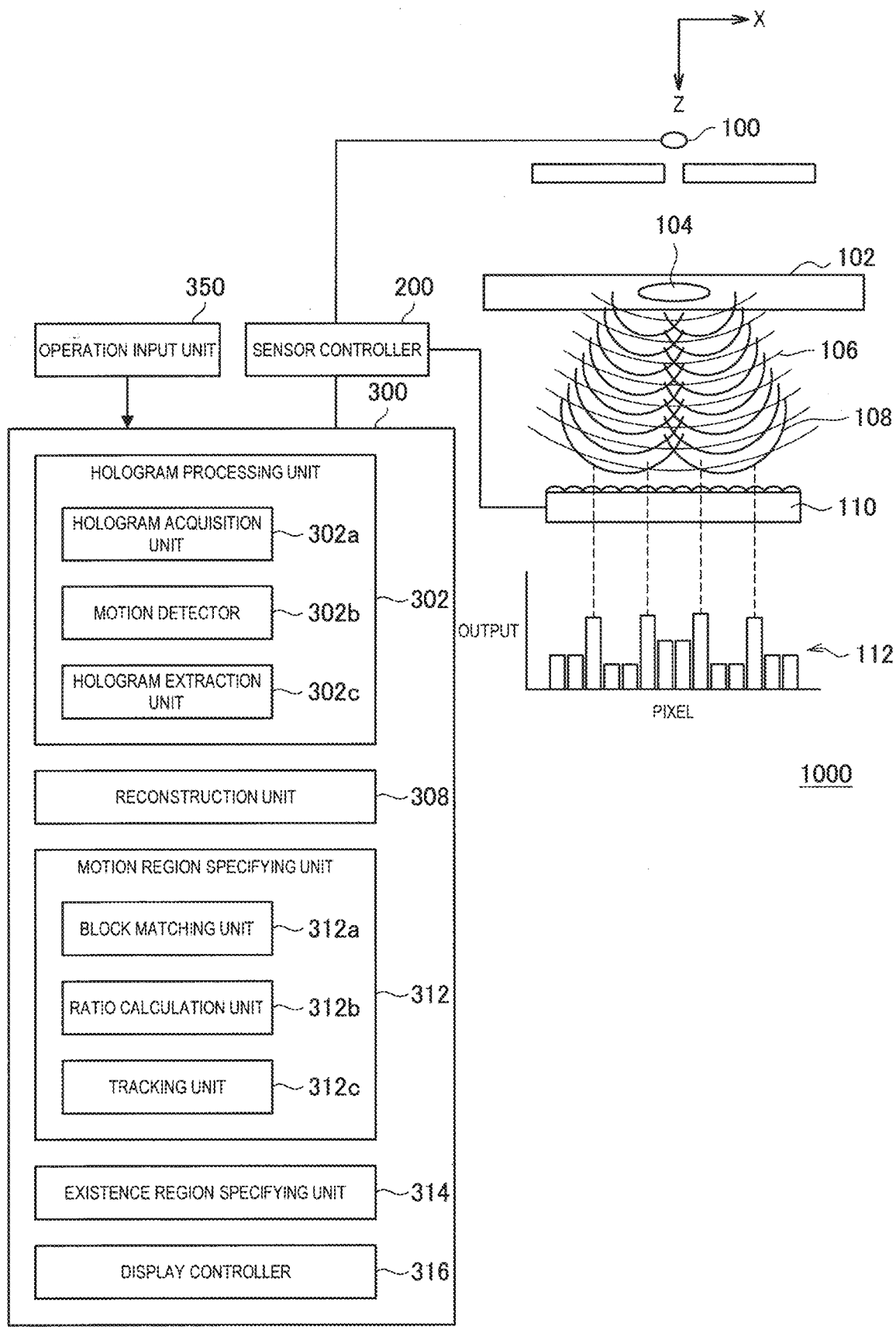

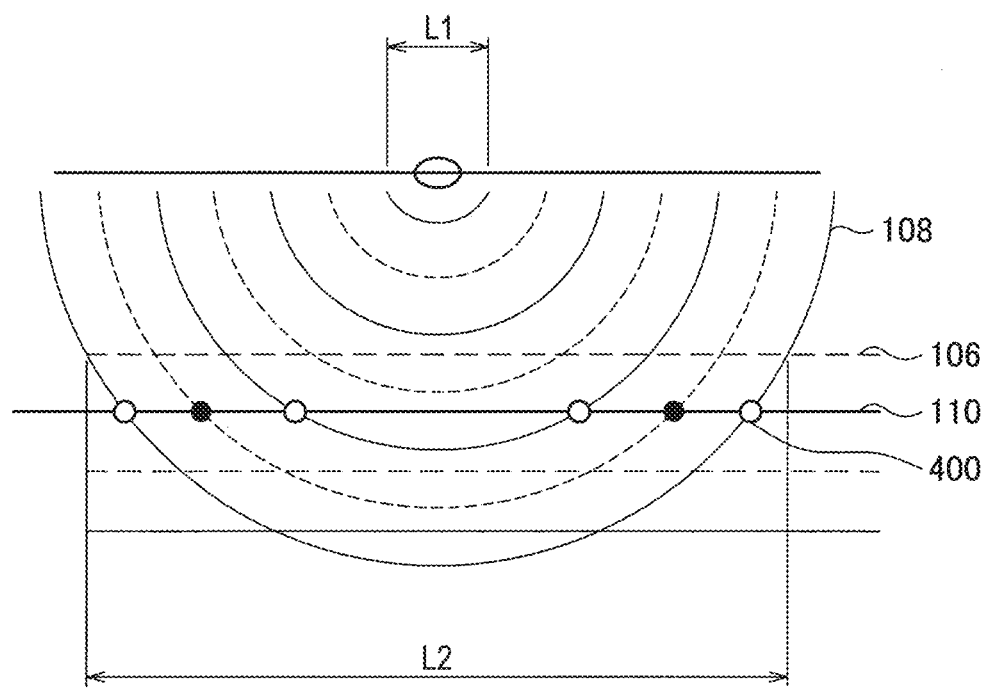
[Fig. 2]

[Fig. 3]
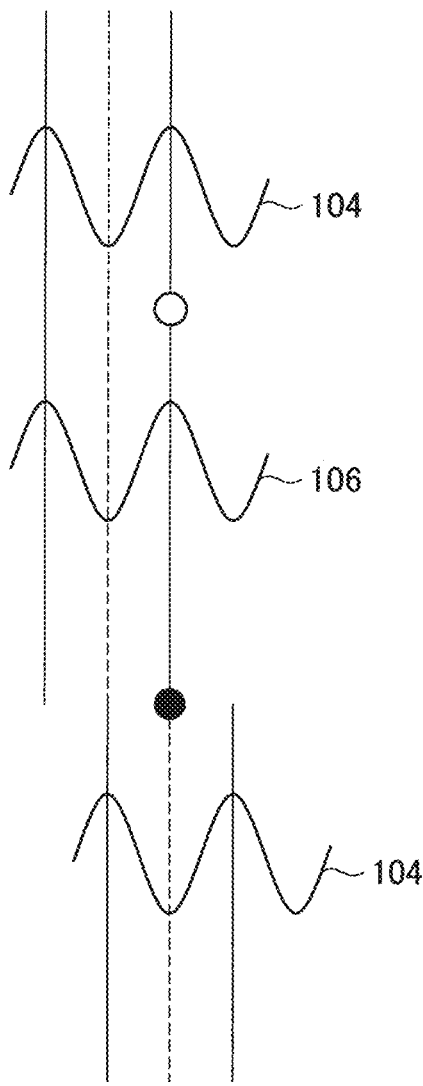
[Fig. 4A]
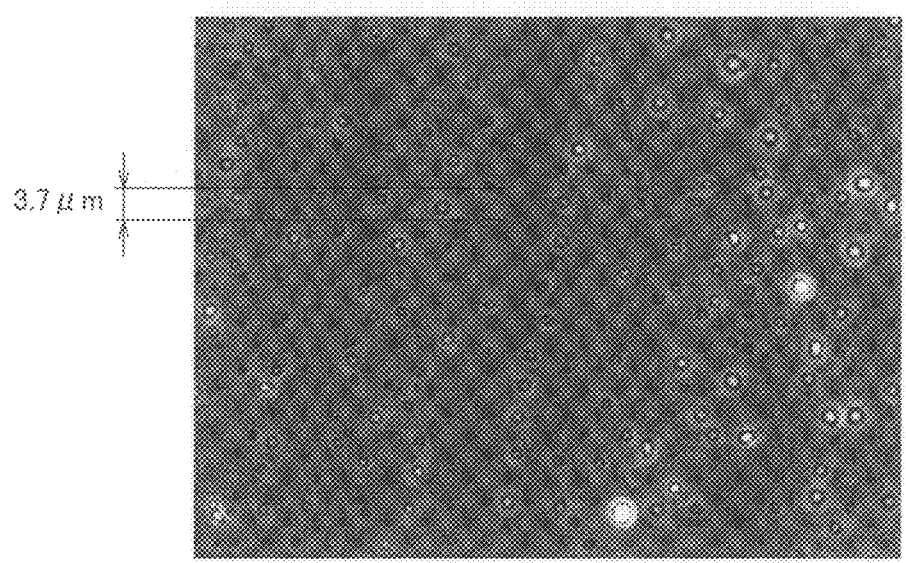

[Fig. 4B]
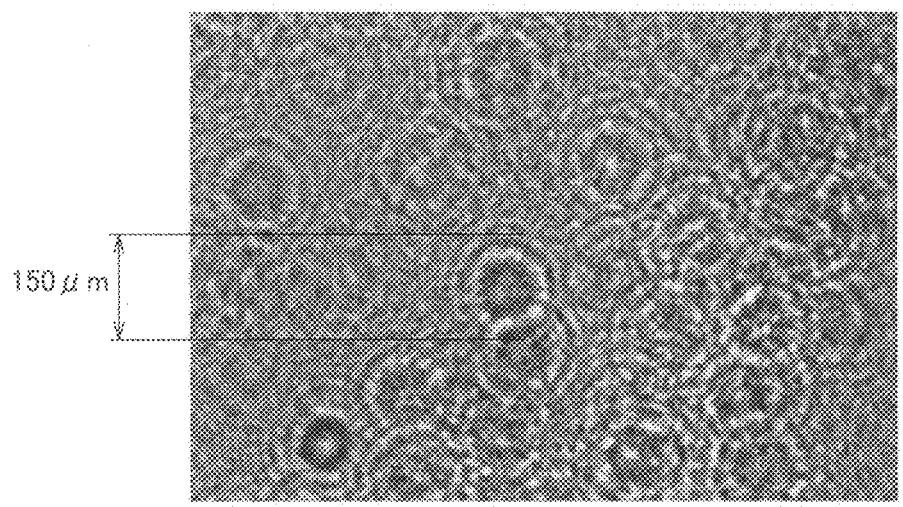
[Fig. 5A]
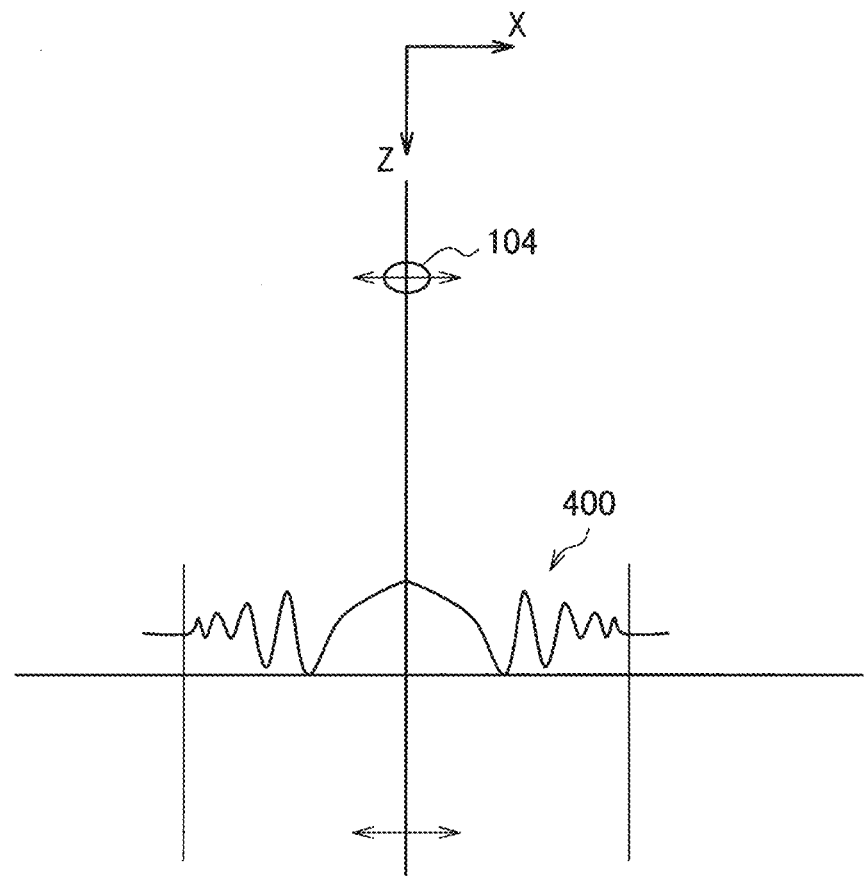

[Fig. 5B]
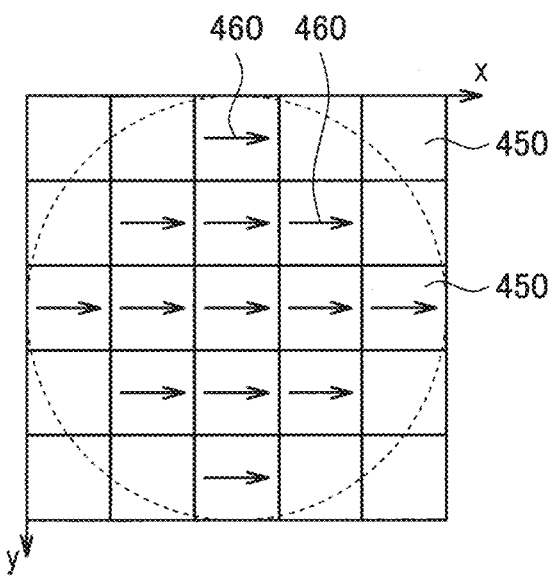
[Fig. 6]
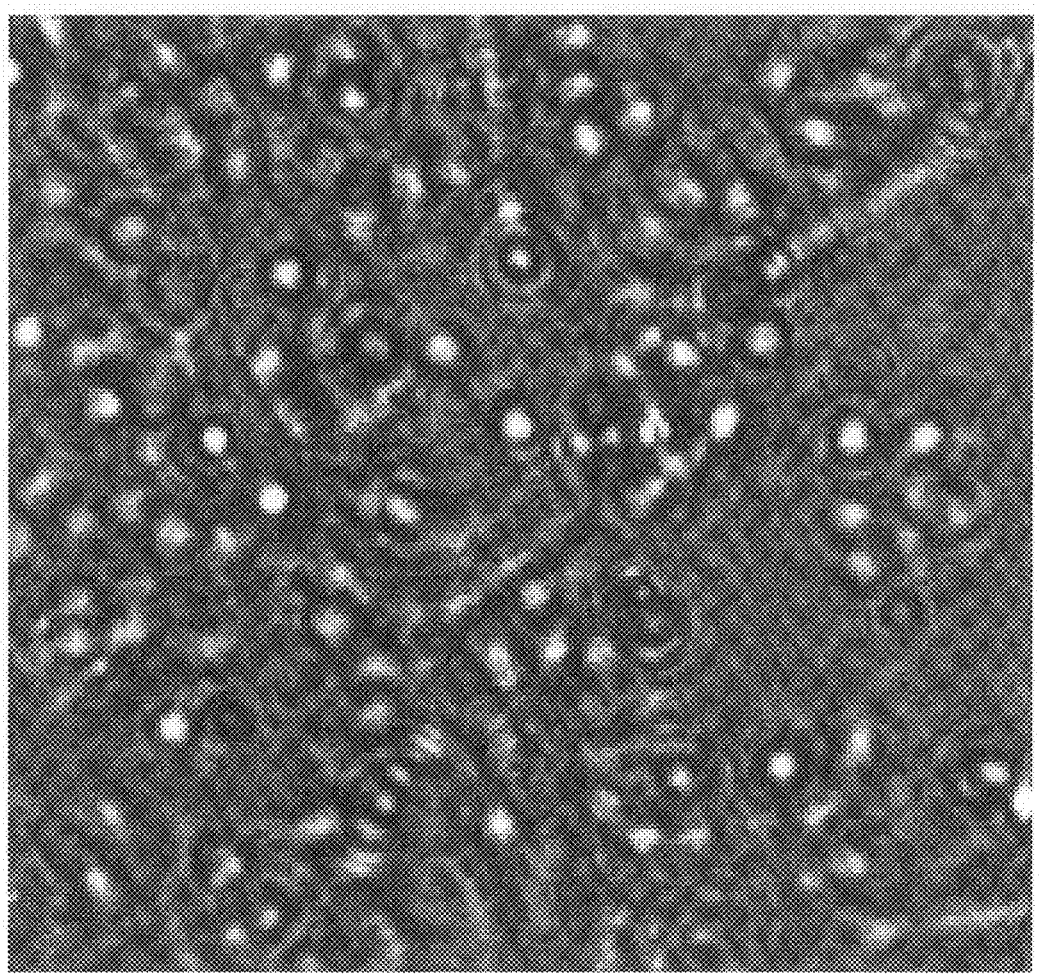

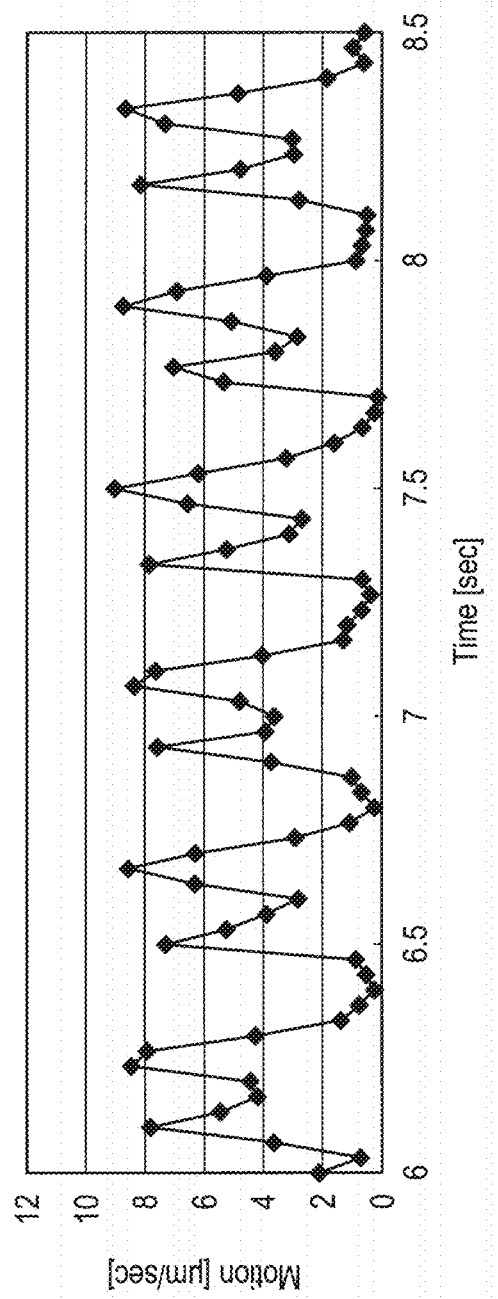
[Fig. 7]

[Fig. 8]
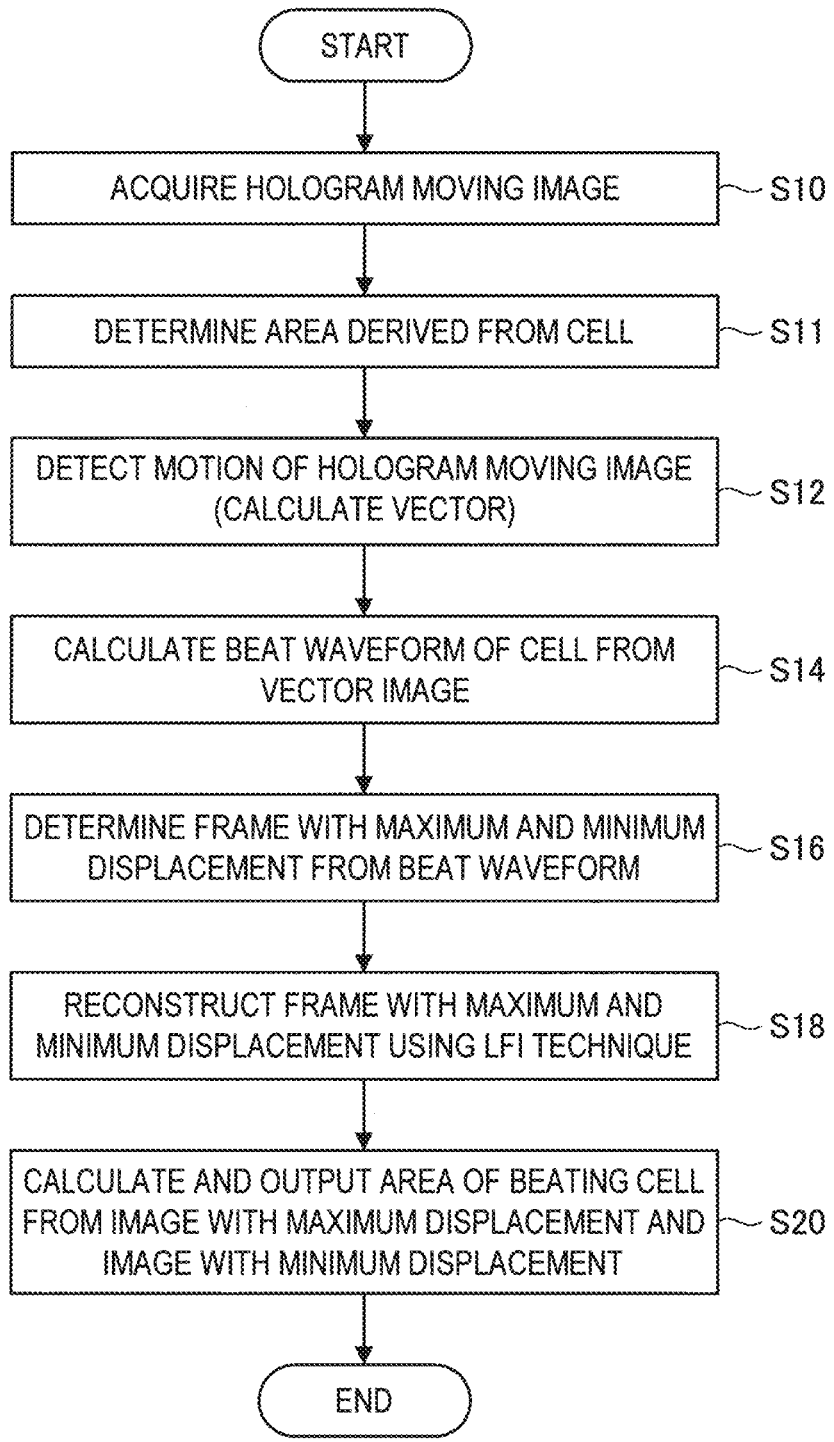

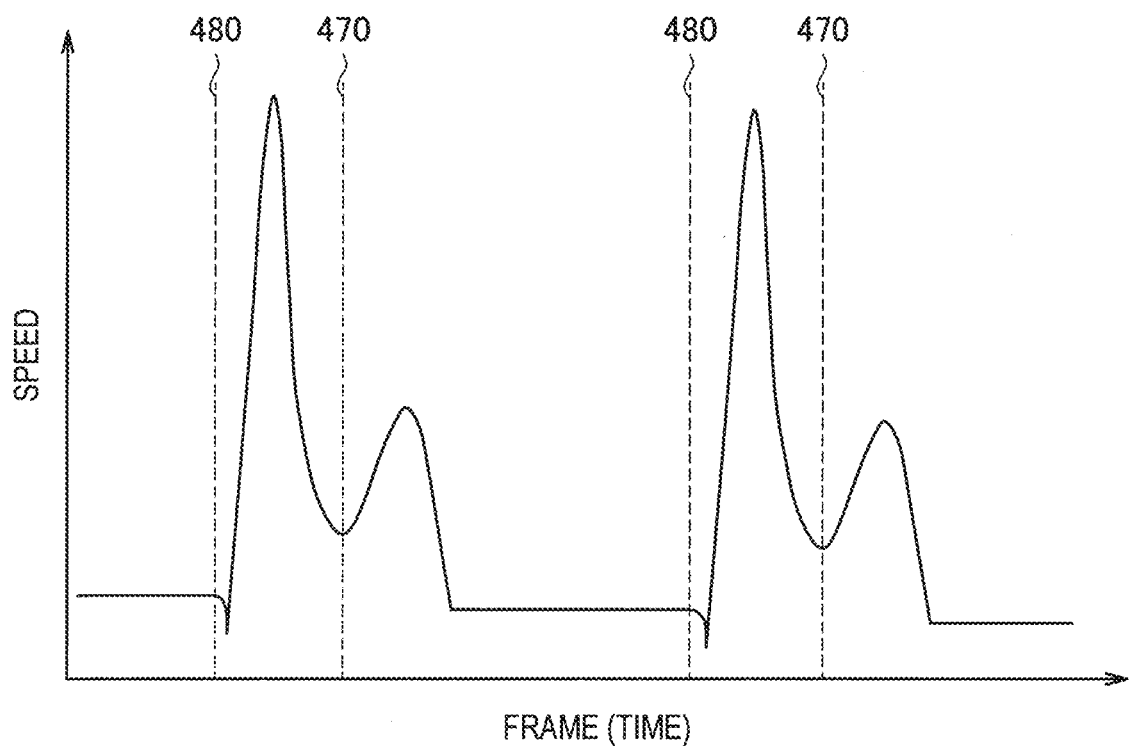
[Fig. 9]

[Fig. 10]
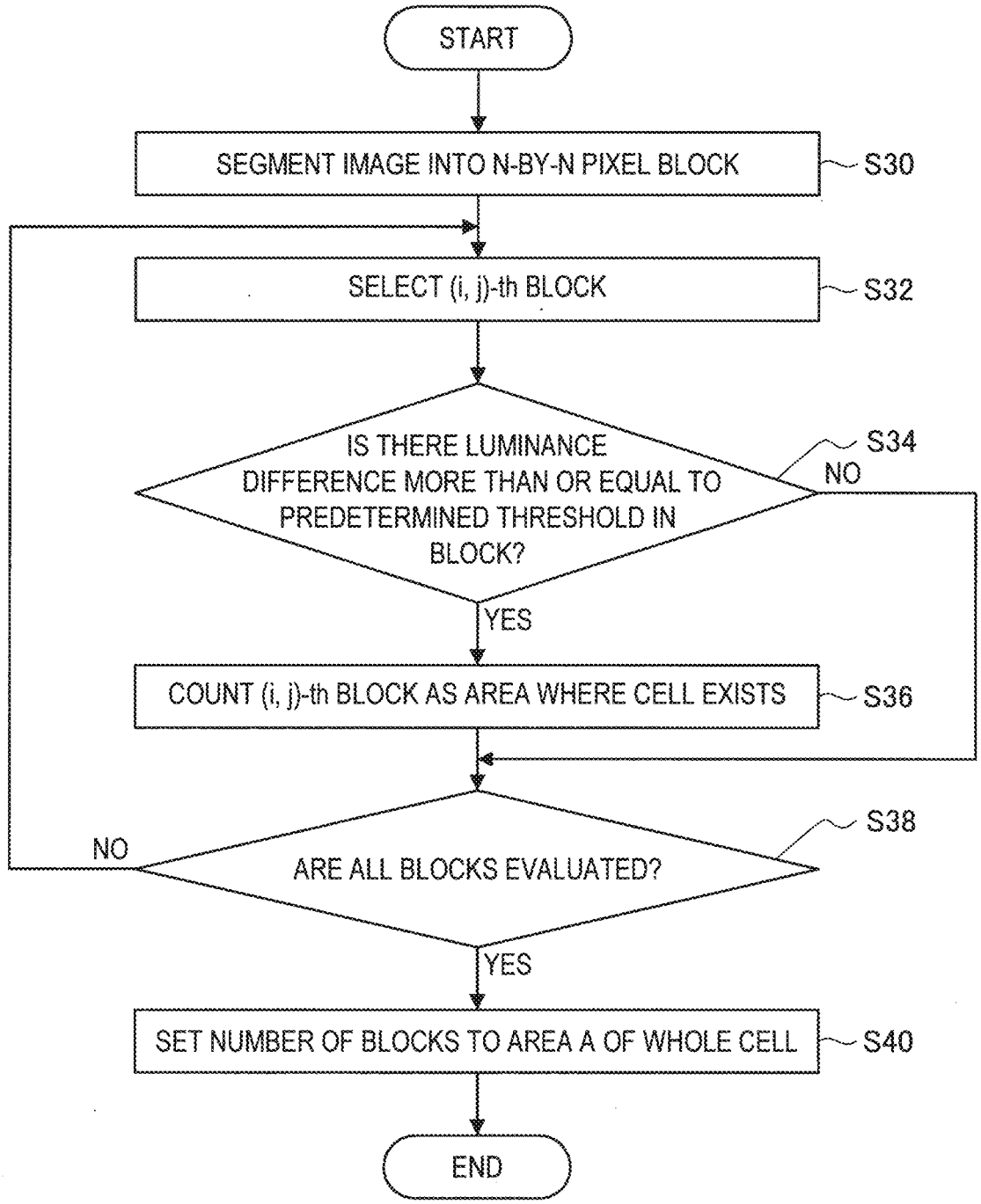

[Fig. 11]
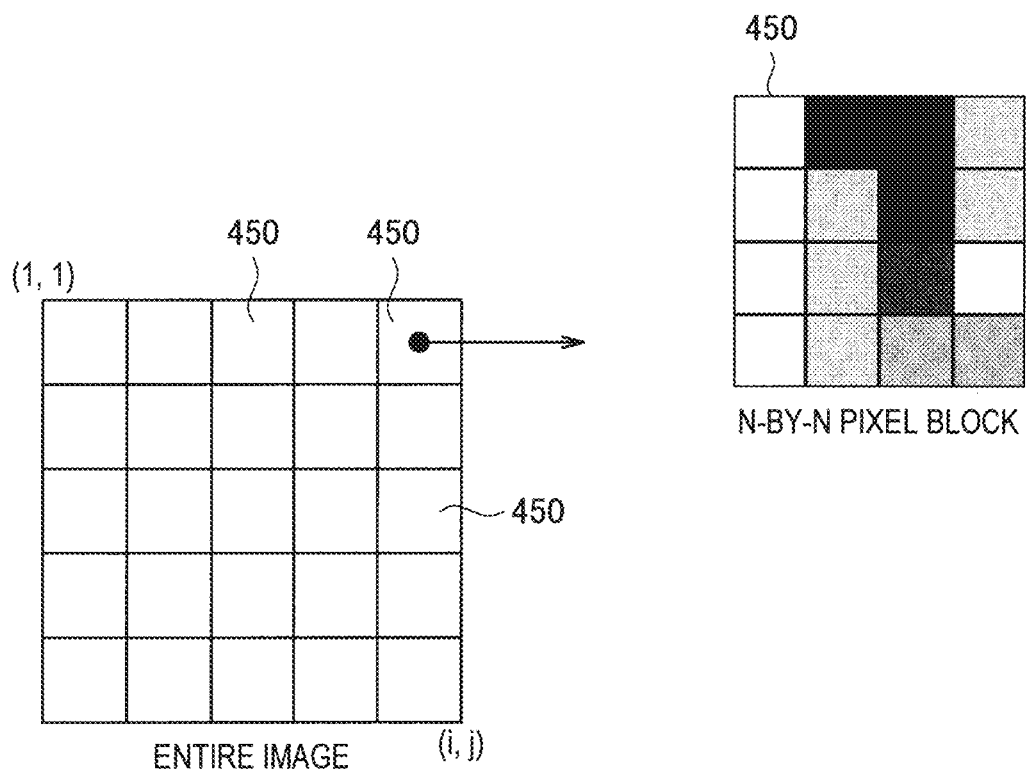

[Fig. 12]
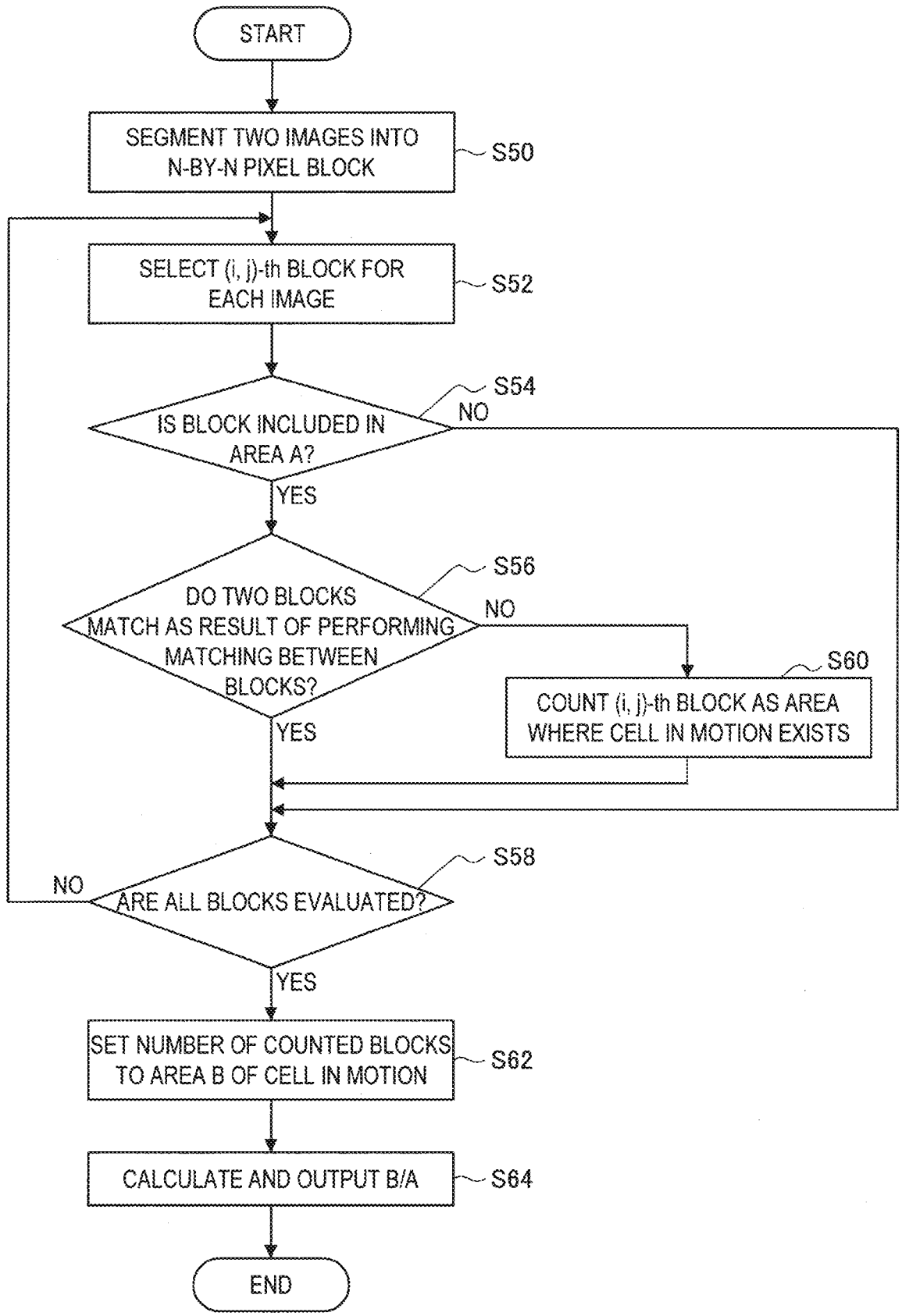

[Fig. 13]
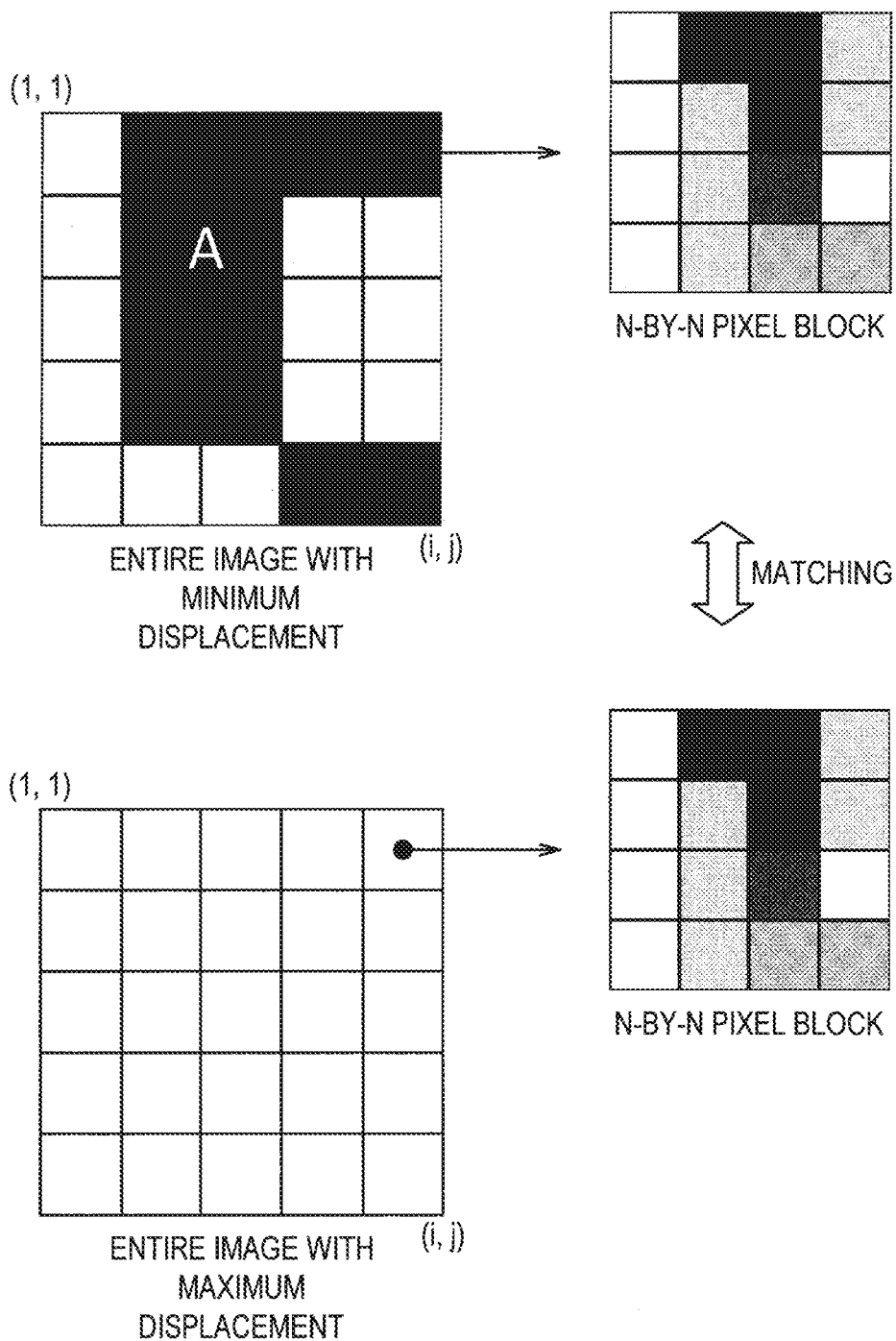

[Fig. 14]
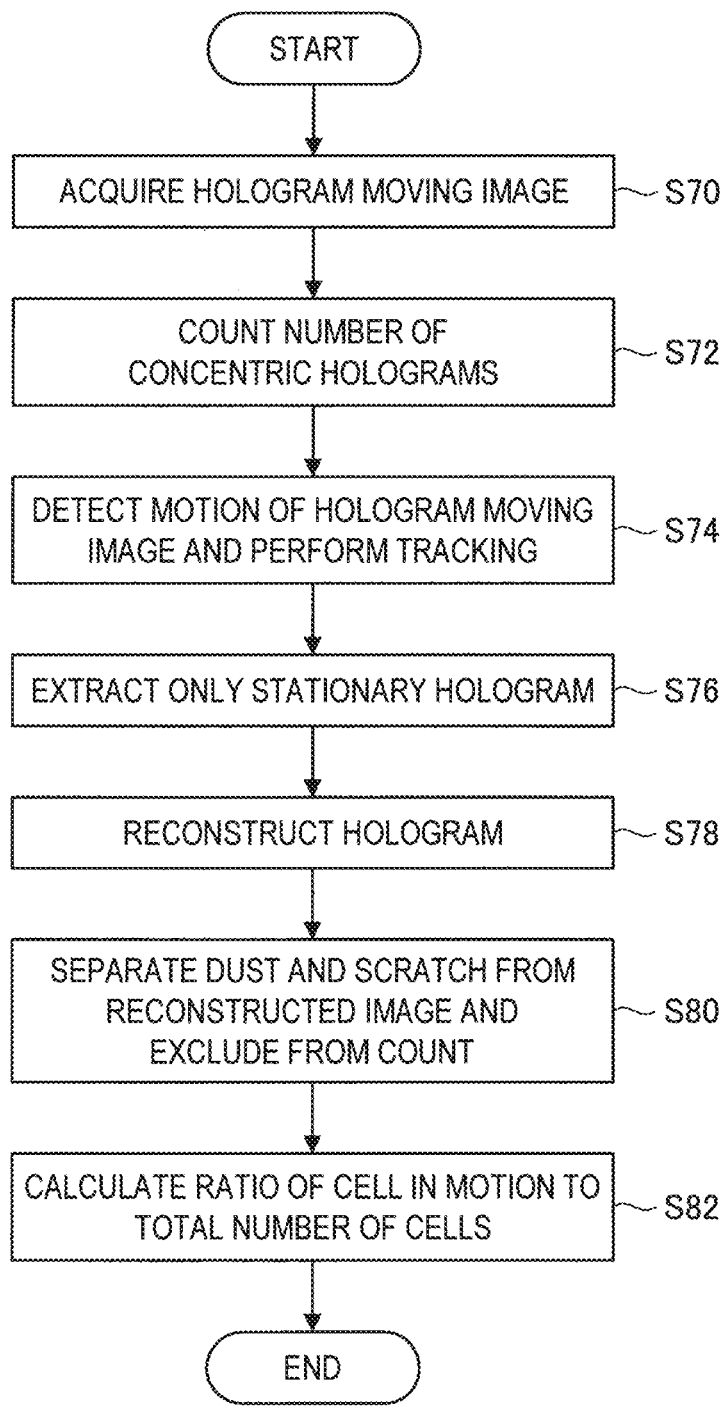

[Fig. 15]
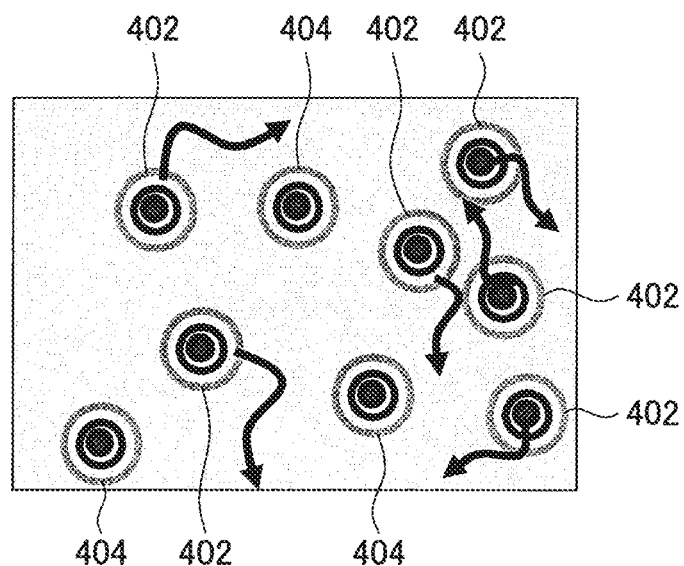
[Fig. 16]
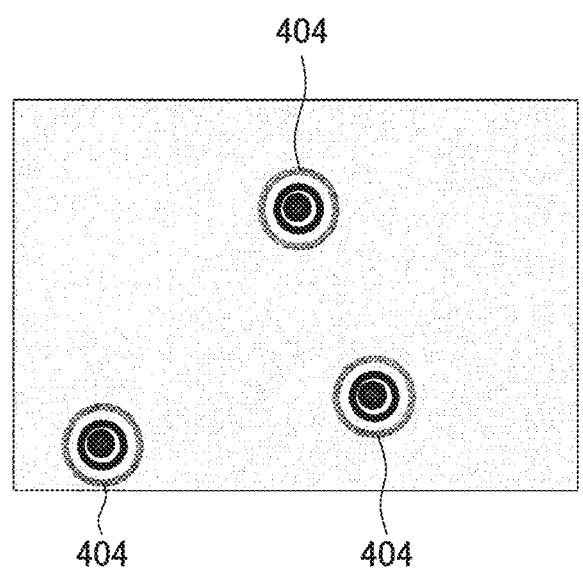

[Fig. 17]
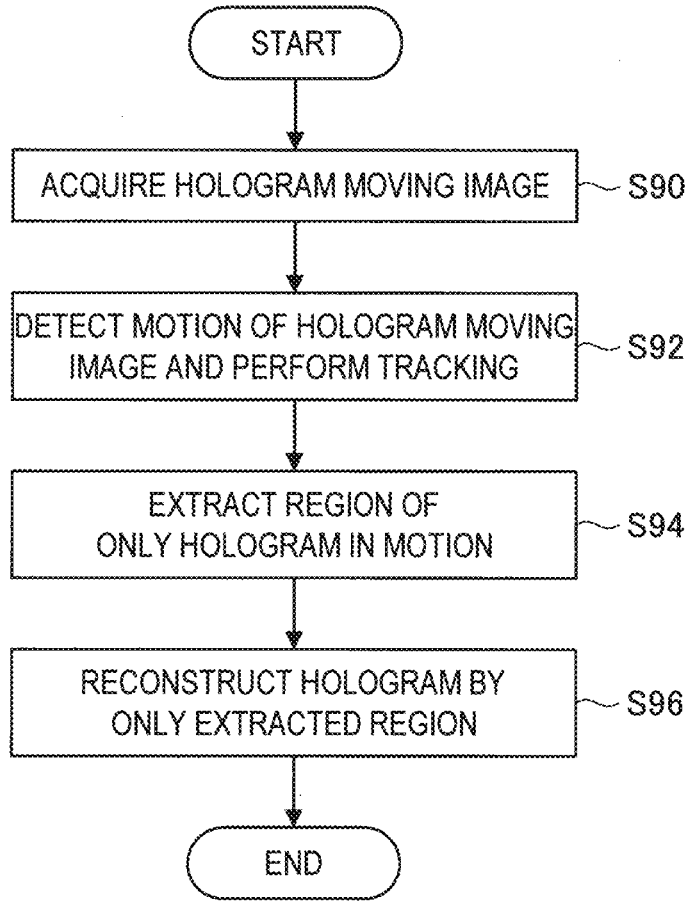
[Fig. 18]
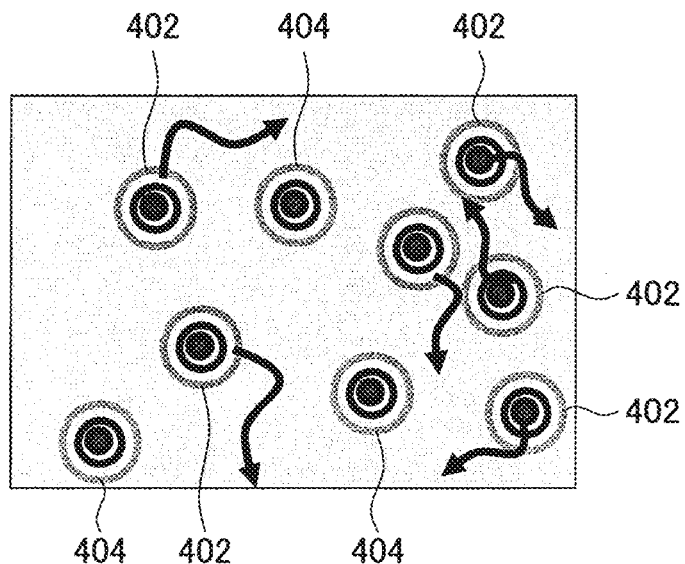

[Fig. 19]
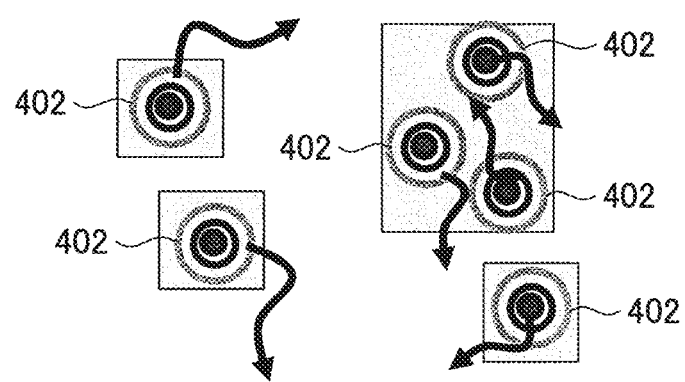

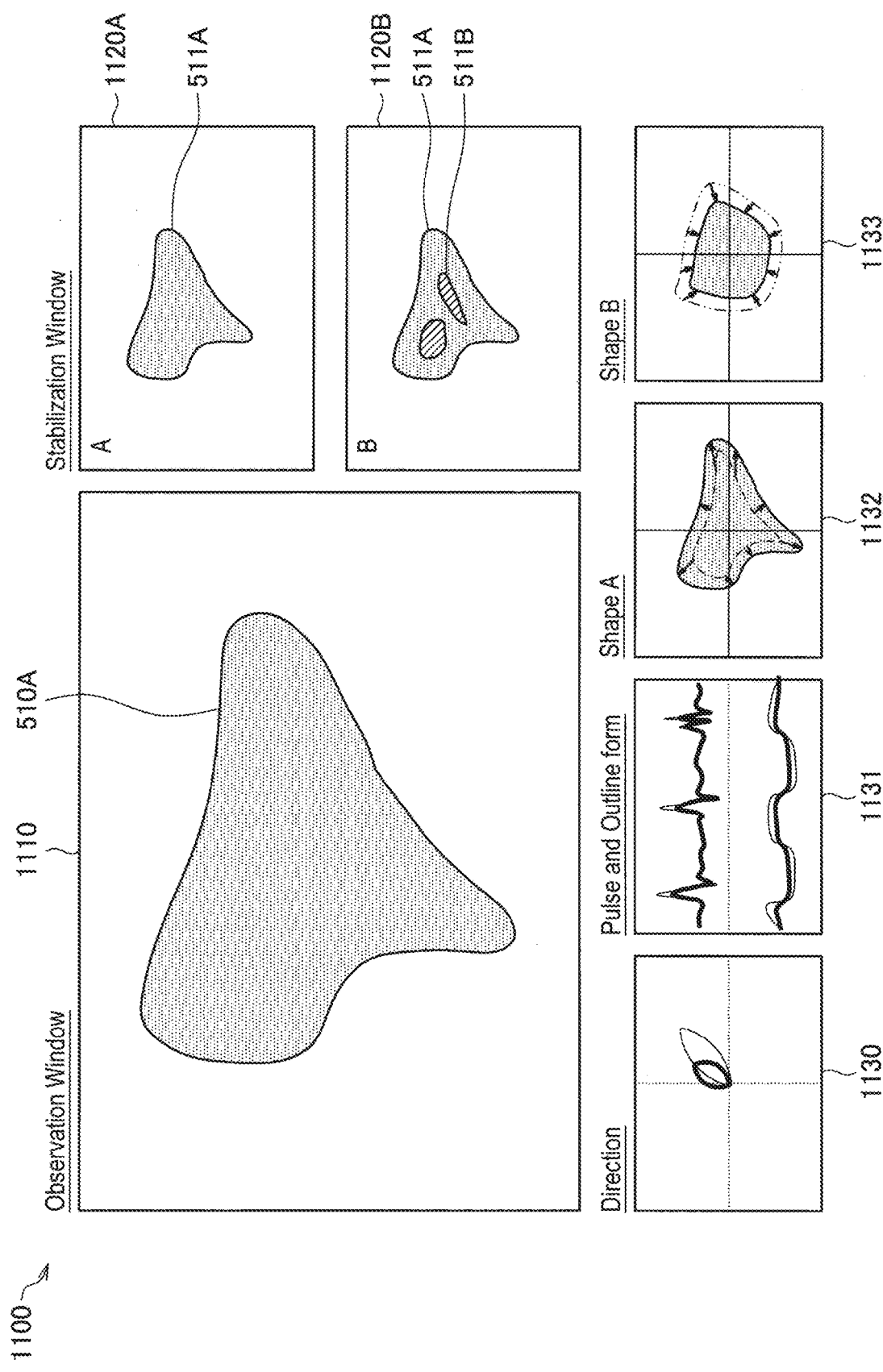

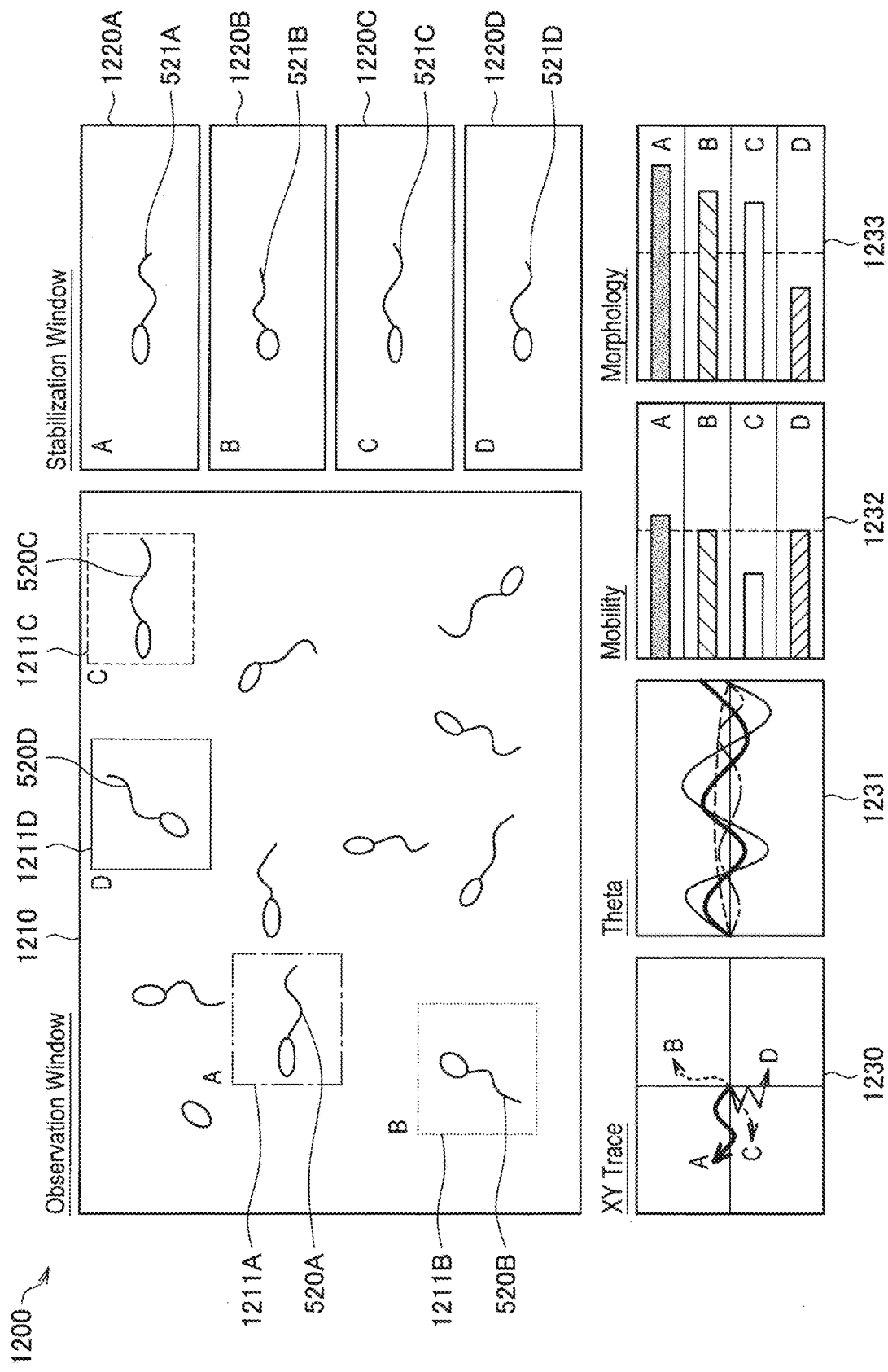

IMAGE PROCESSING APPARATUS, METHOD OF IMAGE PROCESSING, AND IMAGE PROCESSING SYSTEM

CROSS REFERENCE TO RELATED APPLICATIONS

This application is a U.S. National Phase of International Patent Application No. PCT/JP2017/004088 filed on Feb. 3, 2017, which claims the priority benefit of Japanese Priority Patent Application No. JP 2016-026758 filed in the Japan Patent Office on Feb. 16, 2016. Each of the above-referenced applications is hereby incorporated herein by reference in its entirety.

TECHNICAL FIELD

The present disclosure relates to an image processing apparatus, a method of image processing, and an image processing system.

BACKGROUND ART

In the field of medicine and life sciences, observations of motion of many types of biological specimens and evaluation of a change in these forms have been made. The change in forms is a variation in motion that incorporates the life activity or life condition of biological specimens, and is related closely to the evaluation of a state of a biological specimen or the like.

In the method of using a general phase-contrast microscope as a technique for observing cells, it is necessary to provide Koehler illumination for illumination and a magnification optical system for observation, which leads to increase in magnitude of the system and in cost. Particularly in a system for observing a target in parallel, it is desirable for an observation optical system itself to have simple structure and the weight and size of being easy to parallelization. However, in a system employing the observation optical system, if the observation of a wide range is intended to be performed, the number of optical systems is necessarily to be increased, which leads to increase in cost disadvantageously.

On the other hand, the method of using in-line holographic image as a technique for visualizing a transparent body is known. However, when a motion parameter of a target object is calculated directly from the in-line holographic image, the area of the target in motion fails to be calculated properly. As one example, when the ratio of the number of cardiac muscle cells that are beating to the number of other cells that are not beating is intended to be calculated, the area of a part in motion fails to be calculated properly, which leads to an incorrect result. In this regard, NPL 1 discloses the method of reconstructing an in-line holographic image to a pictorial image using LFI technologies. Such reconstruction makes it possible to calculate correctly the area of a target from a hologram.

On the other hand, it is possible to detect motion of a target object using a hologram that is not reconstructed. As one example, PTL 1 discloses the method of detecting motion of an image.

CITATION LIST

Patent Literature

[PTL 1]
JP 5772817B

Non Patent Literature

[NPL 1]
"Compact, light-weight and cost-effective microscope based on lensless incoherent holography for telemedicine applications" by Onur Mudanyali, Derek Tseng, Chulwoo Oh, Serhan O. Isikman, Ikbal Sencan, Waheb Bishara, Cetin Oztoprak, Sungkyu Seo, Bahar Khademhosseini, Aydogan Ozcan, www.rsc.org/loc

SUMMARY

Technical Problem

The use of an in-line holographic image makes it possible to reduce the size of the system when a wide range of cells are observed, as compared with the magnification optical system. However, the calculation of a correct area value from the in-line holographic image is necessary to generate a reconstructed image for all frames, and thus the load on calculation processing increases, which causes much longer calculation time.

Therefore, it is desirable to minimize a processing load due to reconstruction of an image when an observation target is observed using a hologram.

Solution to Problem

According to the present disclosure, there is provided an image processing apparatus including: a motion detector configured to detect motion of an observation target from a hologram of the observation target; a hologram processing unit configured to extract a portion of the hologram based on a result obtained by detecting the motion of the observation target; and a reconstruction unit configured to reconstruct an image from a portion of the extracted hologram.

Further, according to the present disclosure, there is provided a method of image processing, the method including: detecting motion of an observation target from a hologram of the observation target; extracting a portion of the hologram based on a result obtained by detecting the motion of the observation target; and reconstructing an image from a portion of the extracted hologram.

Further, according to the present disclosure, there is provided an image processing system including: a light source configured to emit partial coherence light to an observation target; an image sensor configured to detect a hologram by interference between transmitted light and diffracted light obtained by separating the partial coherence light by the observation target; a motion detector configured to detect motion of the observation target from the hologram; a hologram processing unit configured to extract a portion of the hologram based on a result obtained by detecting the motion of the observation target; and a reconstruction unit configured to reconstruct an image from a portion of the extracted hologram.

Advantageous Effects of Invention

According to the present disclosure as described above, it is possible to minimize a processing load due to reconstruction of an image when an observation target is observed using a hologram. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a schematic diagram illustrating a system according to an embodiment of the present disclosure.

FIG. 2 is a schematic diagram illustrating a hologram obtained from the system of FIG. 1.

FIG. 3 is a schematic diagram illustrated to describe how to occur a dark part (black circle) and a bright part (white circle) in interference fringes.

FIG. 4A is a diagram illustrating an image obtained by observing microbeads with a microscope.

FIG. 4B is a diagram illustrating an image obtained by observing microbeads through a hologram.

FIG. 5A is a schematic diagram illustrating a case where an observation target vibrates from side to side.

FIG. 5B is a schematic diagram illustrating a state where a hologram on the XY plane is viewed.

FIG. 6 is a schematic diagram illustrating a hologram obtained by capturing a cultured cardiac muscle cell by the system of FIG. 1.

FIG. 7 is a schematic diagram illustrating a motion analysis result (beat waveform) obtained by performing block matching on the hologram of FIG. 6.

FIG. 8 is a flowchart illustrating an overall process for detecting a beat area ratio.

FIG. 9 is a diagram illustrating FIG. 7 in detail, and it is a characteristic diagram illustrating the maximum and minimum displacements of a beat waveform.

FIG. 10 is a flowchart illustrating a process for calculating a ratio between a cell with beat and a cell with no beat from an image having maximum displacement and an image having minimum displacement.

FIG. 11 is a schematic diagram illustrating a state where a reconstructed image is segmented into a plurality of blocks, each block including N by N pixels.

FIG. 12 is a flowchart illustrating a process for calculating the area of a cell in motion from an image having minimum displacement and an image having maximum displacement.

FIG. 13 is a schematic diagram illustrating how each of the image having minimum displacement and the image having maximum displacement is segmented into a plurality of N-by-N pixel blocks and block matching is performed between the selected blocks.

FIG. 14 is a flowchart illustrating a process according to a second embodiment.

FIG. 15 is a schematic diagram illustrating a concentric hologram counted in step S72.

FIG. 16 is a schematic diagram illustrating a state where only a stationary hologram is extracted in step S76.

FIG. 17 is a flowchart illustrating an example in which only a cell that is in motion in cells that move randomly individually, such as a sperm, is extracted to reduce calculation load.

FIG. 18 is a schematic diagram illustrating an image of a concentric hologram.

FIG. 19 is a schematic diagram illustrating a result obtained by extracting a region of only a hologram that is in motion.

FIG. 20 is a diagram illustrating an example in which the processing result according to the first embodiment is displayed.

FIG. 21 is a diagram illustrating an example in which the processing result according to the second embodiment is displayed.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. First Embodiment
1.1. Configuration Example of System
1.2. Process for Detecting Beat Area Ratio
2. Second Embodiment
2.1. Example of Observation of Cell having Random Motion
3. Application Example of Processing Result

1. First Embodiment 1.1. Configuration Example of System

An overview of an image processing system 1000 according to each of embodiments of the present disclosure will be described with reference to FIG. 1. FIG. 1 is a schematic diagram illustrating the image processing system 1000 according to each of embodiments of the present disclosure, and illustrates a configuration of general lens-free imaging (LFI) system. In the configuration illustrated in FIG. 1, the light emitted from a light source 100 configured to emit partial coherence light enters an observation target 104 on a sample stage 102. The light source 100 is composed of a combination of a laser diode (LD) or LED and a pinhole, as one example, to emit the partial coherence light. In the present embodiment, the observation target 104 is originated in a living body as one example, and an example thereof includes a small organism such as cell, tissue, sperm, fertilized egg, and zebrafish.

The light incident on the observation target 104 is separated into transmitted light 106 and diffracted light 108. The transmitted light 106 interferes with the diffracted light 108 on an image sensor 110 that generates a hologram image output 112. The transmitted light 106 can be referred to as reference light for generating a hologram. The image processing system 1000 is configured to further include a controller 200, an arithmetic operation unit (image processing device) 300, and an operation input unit 350. The controller 200 is used to control the light source 100 and the sensor 110. The arithmetic operation unit 300 is used to process the obtained data. The operation input unit 350 is used to receive operation information from a user as an input.

The arithmetic operation unit 300 is composed of a circuit (hardware) or a central processing unit such as CPU and a program (software) for causing it to function. The arithmetic operation unit 300 is configured to include a hologram processing unit 302, a reconstruction unit 308, a motion region specifying unit 312, an existence region specifying unit 314, and a display controller 316. The hologram processing unit 302 is configured to include a hologram acquisition unit 302a, a motion detector 302b, and a hologram extraction unit 302c. The hologram acquisition unit 302a acquires a hologram 400 of the observation target 104 from the sensor 110 through the controller 200. The motion detector 302b detects motion of the observation target 104 from the hologram 400. The hologram extraction unit 302c extracts a portion of the hologram 400 based on a result obtained by detecting motion of the observation target 104. The reconstruction unit 308 reconstructs an image from the extracted hologram 400. The motion region specifying unit 312 is configured to include a block matching unit 312a, a ratio calculation unit 312b, and a tracking unit 312c. The existence region specifying unit 314 is configured to include a counter.

FIG. 2 is a schematic diagram illustrating the hologram 400 obtained from the sensor 110. The hologram 400 is generated on the sensor 110 by the interference between the diffracted light 108 diffracted by the observation target 104 and the transmitted light 106 (reference light) transmitted through the observation target 104. The interference fringes of the hologram 400 have a pattern in which bright and dark bands are produced in a concentric manner, as shown with a black circle (dark part) and a white circle (bright part) on the sensor 110 in FIG. 2. In this case, when the size of a target is set to L1, the size L2 of the hologram 400 observed on the sensor 110 varies depending on the wavelength of the light source 100 and the distance between the observation target 104 and the sensor 110, resulting in L2>L1.

FIG. 3 is a schematic diagram illustrated to describe how to occur the dark part (black circle) and the bright part (white circle) in the interference fringes. Of the diffracted light 108 and the transmitted light 106, the bright part (white circle) occurs when wave fronts are aligned constructively, and the dark part (black circle) occurs when wave fronts are destructively shifted by $\lambda/2$. In the diffracted light 108 and the transmitted light 106 shown in FIGS. 2 and 3, the solid line and the broken line represent wave fronts having maximum amplitude of a light wave and wave fronts having minimum amplitude of a light wave, respectively. The interference fringes can be calculated more accurately using Fresnel-Kirchhoff diffraction formula or Rayleigh-Sommerfeld diffraction formula.

FIGS. 4A and 4B are diagrams illustrating a comparison between an image and the hologram 400 with a microscope. FIG. 4A illustrates an image obtained by observing microbeads with a microscope. Similarly, FIG. 4B illustrates an image (wavelength of 635 nm) obtained by observing microbeads through the hologram 400. The size of a microbead is 3.7 μm, but the size of a microbead observed through the hologram 400 is more than or equal to 150 μm.

FIG. 5A illustrates a case where the observation target 104 vibrates from side to side. In this case, the concentric hologram 400 that is obtained vibrates from side to side, which is similar to the observation target 104. The shift amount of the hologram 400 does not differ from the actual shift amount of the observation target 104. In the hologram 400, when motion vector analysis such as block matching and optical flow is performed, the shift amount of the observation target 104 can be measured correctly, but the area of a moving object fails to be measured correctly.

FIG. 5B illustrates the hologram 400 on the XY plane, and represents an output from the sensor 110. The motion detector 302b of the hologram processing unit 302 detects motion of the observation target 104 from the hologram 400 using vector analysis. As disclosed in PTL 1, in the vector analysis, an image of the hologram 400 is segmented into a plurality of blocks 450 and the image matching is performed in units of block 450, thereby calculating a motion vector 460. The use of the number of the blocks 450 in motion makes it possible to measure the area of the observation target 104 in motion. However, the hologram 400 obtained by capturing the observation target 104 appears to be larger than an actual observation target 104, the hologram 400 will be calculated to have the area larger than the actual observation target 104.

The correct measurement of the area of the observation target 104 in motion is achieved by reconstructing the observation target 104 from the hologram 400 into the original image, thereby calculating the area from the reconstructed image. Thus, the reconstruction unit 308 performs a process for reconstructing an image from the hologram 400. The reconstruction of an image from the hologram 400 can be performed by lens-free imaging, and uses a technique disclosed in NPL 1 as described above. As one example, when the proportion of those having periodic motion between contraction and relaxation is intended to be calculated from the observation target 104 that exists in the observation field of view, it is possible to calculate correctly the area of a portion in motion by pattern matching if an image having a displacement of 0 and a reconstructed image having maximum displacement are obtained. Thus, the hologram extraction unit 302c of the hologram processing unit 302 extracts the hologram 400 having a displacement of 0 and the hologram 400 having maximum displacement, the reconstruction unit 308 reconstructs only the extracted hologram 400. The reconstruction of only the image having a displacement of 0 and the image having maximum displacement can reduce the computation time significantly, as compared with the case where all the frames are reconstructed.

A technique for detecting a beat area ratio by taking a case of the cultured cardiac muscle cell as an example of the observation target 104 having periodic motion. FIG. 6 is a schematic diagram illustrating the hologram 400 obtained by capturing the cultured cardiac muscle cell by the image processing system 1000, and the hologram 400 is not reconstructed. FIG. 7 is a schematic diagram illustrating a motion analysis result (beat waveform) obtained by performing the block matching on the hologram 400. In FIG. 7, the horizontal axis represents time, and the vertical axis represents speed.

The motion analysis shown in FIG. 7 can be acquired by calculating a motion vector for each block on the frame image data at the current time and the frame image data at the immediately previous time, and it can be acquired using the method disclosed in PTL 1, as one example. The value of speed shown in FIG. 7 indicates an average of the obtained motion vectors. As illustrated in FIG. 7, two periodic sets of peaks are observed in the waveform of the speed, that is, the first peak indicates contraction, and the second peak indicates relaxation. A portion corresponding to a valley between contraction and relaxation indicates the maximum displacement point of the beat.

1.2. Process for Detecting Beat Area Ratio

FIG. 8 is a flowchart illustrating an overall process for detecting a beat area ratio. FIG. 9 is a diagram illustrating FIG. 7 in more detail, and it is a characteristic diagram illustrating positions of the maximum displacement 470 and minimum displacement 480 in the beat waveform. In step S10, a moving image of the hologram 400 is acquired. Then, in step S11, the area of the hologram 400 derived from a cell is determined based on a threshold of the contrast. In other words, in step S11, a region where a cell exists is specified. The beat waveform may be calculated from the whole screen without specifying a region where a cell exists. Then, in step S12, a motion vector is detected from the moving image of the hologram 400. In this case, the detection of the motion vector of only the cell-derived region that is determined in step S11 makes it possible to reduce the processing load. In the process of step S11, the region where a cell exists may be determined based on the number of blocks having a luminance difference that is more than or equal to a predetermined value, which is similar to a process in FIG. 10 described later.

Then, in step S14, the beat waveform of a cell is calculated from an image of the motion vector. Then, in step S16, a frame of the maximum displacement 470 and minimum displacement 480 in the beat waveform is determined from the beat waveform. As illustrated in FIG. 9, a cell appears to be larger from the minimum displacement 480 and then is the largest at the maximum displacement 470. Next, the cell contracts and then is the smallest at the next minimum displacement 480. Then, in step S18, the frame of the maximum displacement 470 and minimum displacement 480 is reconstructed using the LFI technique. This allows an image having maximum displacement to be obtained from the frame of the maximum displacement 470 and allows an image having minimum displacement to be obtained from the frame of the minimum displacement 480. Then, in step S20, the ratio (area ratio) of a beating cell is calculated from the image having maximum displacement and the image having minimum displacement and is outputted.

Although two frames of the maximum displacement 470 and the minimum displacement 480 are reconstructed in the process described above, the frames of the maximum displacement 470 and the minimum displacement 480 appear periodically, and thus an average of a plurality of frames may be reconstructed.

Then, a process for calculating a ratio between a cell with beat and a cell with no beat from the image having maximum displacement and the image having minimum displacement is now described. FIG. 10 is a flowchart illustrating a process for calculating the area in which a cell exists from an image cell of the minimum displacement or the maximum displacement to exclude a planar area in which there is no cell from the calculation. In this process, the area A is calculated by counting the number of blocks having a luminance difference that is more than or equal to a predetermined threshold among blocks of the reconstructed image. The calculation of area is performed by the existence region specifying unit 314. The area A can be calculated from any one or both of the image having maximum displacement and the image having minimum displacement. When the area A is calculated from both the image having maximum displacement and the image having minimum displacement, the calculation accuracy can be improved even more. A region where a cell exists may be specified based on user operation information inputted to the operation input unit 350. It is possible for the user to specify a region where a cell exists by specifying a region in a screen based on the screen displayed on a display unit by the display controller 316.

In step S30, a block 450 of N by N pixels is sequentially extracted from a reconstructed image, and thus the reconstructed image is segmented into each block 450 of N by N pixels. FIG. 11 illustrates a state where the entire reconstructed image is segmented into a plurality of blocks, and each block contains N by N pixels.

Then, in step S32, the (i, j)-th block is selected. Then, in step S34, determination of whether there is a luminance difference more than or equal to a predetermined threshold in the block selected in step S32 is performed. FIG. 11 illustrates a state where one of N-by-N pixel blocks is extracted, and the luminance of each pixel in the extracted block is represented by concentration. As one example, when a luminance value is represented by eight bits, the luminance of each pixel can be represented by 255 levels. The maximum luminance difference is obtained, and in step S34, the determination of whether the maximum luminance difference is more than or equal to a predetermined threshold is performed.

In step S34, if there is a luminance difference that is more than or equal to a predetermined threshold in the block, the process proceeds to step S36. When there is a luminance difference that is more than or equal to a predetermined threshold in the block, it is determined that the block corresponds to the position of a cell. On the other hand, if there is no luminance difference that is more than or equal to a predetermined threshold in the block, for example, if the block has a uniform luminance, such as white or black, it is determined that the block is a region that does not correspond to a cell. Thus, it is possible to determine the area A in which a cell exists from the total number of blocks in which there is the luminance difference that is more than or equal to the threshold.

In step S36, the (i, j)-th block is counted as an area in which a cell exists. This counting is performed by the counter of the existence region specifying unit 314. After step S36, the process proceeds to step S38. Alternatively, if it is determined in step S34 that the luminance difference in the block is less than the predetermined threshold, the process proceeds to step S38.

In step S38, a determination of whether all the blocks are evaluated is performed, and if all the blocks are evaluated, then the process proceeds to step S40. In step S40, the finally counted number of blocks is set to the whole cell. On the other hand, not all the blocks are evaluated in step S38, the process returns to step S32 and the subsequent block is selected.

In the process of FIG. 10 as described above, if there is a luminance difference that is more than or equal to a predetermined threshold in a block, it is determined that a cell exists in the block, and the total number of blocks is determined, thereby determining the area A of an area in which a cell exists from the number of blocks.

Although the area A of the area in which a cell exists is calculated from the number of blocks in which the luminance difference is more than or equal to a predetermined threshold in the process of FIG. 10, an area in which a cell exists and an area in which there is no cell are detected, the area in the closed edge may be set to the area A of an area in which a cell exists.

FIG. 12 is a flowchart illustrating a process for calculating the area of a cell in motion from the image having minimum displacement and the image having maximum displacement. The image having minimum displacement and the image having maximum displacement are subject to a similar process. In step S50, a block of N by N pixels is extracted from each of the image having minimum displacement and the image having maximum displacement, which is similar to step S30 of FIG. 10, and thus each image is segmented into N-by-N pixel blocks.

Then, in step S52, the (i, J)-th block is selected for each of the images. In step S54, a determination of whether the block selected in step S52 is included in the region of the area A calculated by the flowchart of FIG. 10 is performed, and if it is included in the region of the area A, then the process proceeds to step S56.

In step S56, the matching is performed between the selected blocks of the image having minimum displacement and the image having maximum displacement. This block matching is performed by the block matching unit 312a of the motion region specifying unit 312. FIG. 13 illustrates how each of the image having minimum displacement and the image having maximum displacement is segmented into a plurality of N-by-N pixel blocks and the block matching is performed between blocks whose positions correspond to each other. The block matching is evaluated based on a parameter indicating a level in which the two blocks match. If the parameter is more than or equal to a predetermined threshold, then the two blocks are determined to match. FIG. 13 illustrates a case where the process of FIG. 10 described above is performed based on the image having minimum displacement and the area A is calculated in the image having minimum displacement.

In step S56, when the two blocks match, the process proceeds to step S58. On the other hand, if the two blocks do not match, the process proceeds to step S60 and the (i, j)-th block is counted as an area in which a moving cell exists, then the process proceeds to step S58. Alternatively, if it is determined in step S54 that a block selected in step S52 is not included in a region of the area A, the process proceeds to step S58.

In this way, if the two blocks do not match in step S56, the block is counted as an area in which a moving cell exists and the area (motion region) of the area in which a moving cell exists is extracted depending on the number of counts. This process is performed by the motion region specifying unit 312.

In step S58, a determination of whether all the blocks are evaluated is performed, and if all the blocks are evaluated, then the process proceeds to step S62. In step S62, the final total number of blocks counted in step S60 is set to an area B of a cell in motion. After step S62, the process proceeds to step S64, and a ratio of the area B to the area A (=B/A) is calculated. The calculation of the ratio is performed by the ratio calculation unit 312b of the motion region specifying unit 312. On the other hand, if not all the blocks are evaluated in step S58, the process returns to step S52 and the subsequent block is selected.

As described above, in the process of FIG. 12, the block matching between the image having minimum displacement and the image having maximum displacement makes it possible to determine the area B of the area in which a moving cell exists and to calculate the ratio of the area B of the area in which a moving cell exists to the area A of the area in which a cell exists.

Although the block matching allows the area B of the area in which a moving cell exists to be calculated FIG. 12, a difference is obtained by subtracting between corresponding pixel values (luminance values) of the image having minimum displacement and the image having maximum displacement, and the area may be calculated from the number of peaks in which the difference exceeds a certain threshold.

The ratio of the area B of the area in which a moving cell exists to the area A of the area in which a cell exists, which is calculated as described above, is a parameter indicating a ratio of cardiac muscle cells with beat of cells within the observation field of view. The area B of the area in which a moving cell exists is less than the area A of the area in which a cell exists, and thus the relationship of area B<area A is established.

As one example, sometimes the cardiac muscle cell produced from the IPS cell may contain a cell that is not actually made up of a cardiac muscle cell. As the ratio of cells made up of the cardiac muscle cell increases, that is, the purity of the cardiac muscle cells increases, the burden on the patient decreases. In this case, the ratio of the area B to the area A that is calculated using the technique according to the present embodiment makes it possible to determine the purity of the cardiac muscle cells with high accuracy.

Although the reconstruction is performed by extracting only the frame of the image having minimum displacement and the image having maximum displacement from the frame of a moving image of the hologram 400 in the process described above, this is possible as long as there is a change in differences detectable from the extracted frame even for other frames than the frame of the image having minimum displacement and the image having maximum displacement. Alternatively, this is possible depending on the purpose, for example, by extracting a frame in which irregular beat occurs.

When the temporal variation of the hologram 400 is limited to a portion of the screen, it is not necessary for the entire image of the hologram 400 to be reconstructed, and thus, an area of the image to be reconstructed may be limited. It is possible to reconstruct only a region where the temporal variation occurs in the image, thereby simplifying the process.

The beat involves propagation particularly in the cardiac muscle image, and thus the image having maximum displacement is not necessarily obtained in the entire screen. When the cardiac muscle cells are not concentrated, sometimes the synchronization of beat may be insufficient. In these cases, the motion waveform may be calculated by segmenting an image of the hologram 400 into a plurality of areas and performing the analysis of motion in each area. In this case, the frames of the extracted image having minimum displacement and image having maximum displacement are different for each of the segmented areas.

According to the first embodiment as described above, the motion analysis is performed based on the hologram 400 of the frames of the moving image of the hologram 400, and only the image having minimum displacement and the image having maximum displacement that are obtained by the motion analysis are reconstructed. The ratio of the area B of the area in which a moving cell exists to the area A of the area in which a cell exists is determined based on the reconstructed image having minimum displacement and image having maximum displacement. The reconstruction of only the image having minimum displacement and the image having maximum displacement allows the processing load to be reduced significantly. This makes it possible to acquire the proportion of a beating cell of the cells in the observation field of view.

2. Second Embodiment 2.1. Example of Observation of Cell Having Random Motion

The second embodiment of the present disclosure is now described. An image processing system according to the second embodiment is similar to the first embodiment. In the second embodiment, a case where the present disclosure is applied to not a cell having periodic motion such as cardiac muscle cells but other cells including a cell having random motion will be described.

In the case of a cell having random motion, the motion of a cell is not periodic, and thus it is assumed a case where the maximum amount of displacement fails to be calculated from the result obtained by analyzing the motion of the hologram 400. As one example, in the case of those having random motion at normal times such as a sperm, the extraction of a frame is performed as follows.

In the case of sperm, the graph of the amount of motion is planar at normal times and the sperm head is observed as the ring-shaped hologram 400, thus it is possible to obtain a desired parameter, such as the number cells and motility, by tracking the interference ring or by analyzing the motion. However, to determine the exact number of cells, it is desirable to distinguish whether the observed interference ring is derived from a cell or is derived from dish scratch or dust. Thus, in the second embodiment, the hologram 400 corresponding to only one frame is reconstructed and scratch or dust is removed, thereby detecting the exact number of cells.

More specifically, the number of ring-shaped holograms is counted from the hologram 400 using pattern matching. The counting is performed by the counter of the existence region specifying unit 314. The number of those in motion of the ring-shaped holograms is counted using the motion vector analysis or tracking. The tracking is performed by the tracking unit 312c of the motion region specifying unit 312 using known techniques such as pattern matching. The ring-shaped hologram is annular, and thus the tracking can be performed relatively easily. At least one frame is extracted from a moving image of a hologram and is reconstructed. Those other than the target cell, such as dust or scratch, are counted based on the image obtained by the reconstruction, and the counted value is subtracted from the number of counts of a moving ring-shaped hologram.

FIG. 14 is a flowchart illustrating a process according to the second embodiment, and illustrates an example of using the reconstructed image to separate scratch or dust and of using a hologram to count cells. In step S70, the moving image of the hologram 400 is acquired. Then, in step S72, the number of concentric holograms (ring-shaped holograms) is counted. FIG. 15 illustrates concentric holograms 402 and 404 counted in step S72. The hologram 402 is in motion, but the hologram 404 is not in motion.

Then, in step S74, the motion of the moving image of the hologram is detected, and the tracking is performed. Then, in step S76, only a stationary hologram 404 is extracted. FIG. 16 is a schematic diagram illustrating a state where only the stationary hologram 404 is extracted in step S76. Then, in step S78, the hologram 404 extracted in step S76 is reconstructed. If the reconstructed image is obtained, it is possible to recognize whether the ring-shaped hologram contains dust or scratch.

Then, in step S80, the dust or scratch is separated from the reconstructed image, and the resultant value is excluded from the number of counts of the hologram 404 that is not in motion. Then, in step S82, the ratio of the number of cells that is in motion to the total number of cells is calculated. In other words, in step S82, the ratio of the number of the hologram 402 to the total number of the holograms 402 and 404 is determined. The calculation of the ratio is performed by the ratio calculation unit 312b of the motion region specifying unit 312. After step S82, the process ends. When the cell is a sperm, only a sperm that is in forward motion is extracted again from sperms that are in motion and is counted, thereby calculating the motility.

As described above, the process of FIG. 14 allows only the hologram 404 that is stationary to be extracted and reconstructed, and thus it is possible to separate dust or scratch and to count exactly the number of cells that are stationary. Thus, it is possible to calculate the ratio of the number of cells that is in motion to the total number of cells with high accuracy.

FIG. 17 is a flowchart illustrating an example in which only a cell that is in motion in the cells that move randomly individually, such as a sperm, is extracted to reduce the calculation load. In step S90, a moving image of a hologram is acquired. Then, in step S92, a motion of the moving image of the hologram is detected and the tracking is performed. This allows the image of the concentric holograms 402 and 404 that are similar to the FIG. 15 to be acquired as illustrated in FIG. 18. Then, in step S94, a region of only the hologram 402 that is in motion is extracted. The extraction of the region is performed by the hologram extraction unit 302c of the hologram processing unit 302. FIG. 19 is a schematic diagram illustrating a result obtained by extracting the region of only the hologram 402 that is in motion. Then, in step S96, the hologram 402 is reconstructed by only the region extracted in step S94. After step S96, the process ends.

As described above, the process of FIG. 17 allows the region of only the hologram 402 that is in motion to be extracted and the reconstruction of the hologram 402 is performed, thereby reducing the calculation load significantly.

3. Application Example of Processing Result

An application example of the processing result by the image processing system 1000 according to each of the embodiments of the present disclosure will be described. The description will be given of a motion compensation process and analysis process while the display controller 316 causes a display unit provided inside or outside the image processing system 1000 to display a screen.

First Application Example: Analysis Process of a Change in Local Morphology of Cardiac Muscle Cells A first application example is now described. FIG. 20 is a diagram illustrating an example in which the processing result according to the first embodiment is displayed. Referring to FIG. 20, a screen 1100 displayed on the display unit by the display controller 316 includes an original moving image displaying screen 1110, a cell existence region displaying screen 1120A, and a cell motion region displaying screen 1120B.

The original moving image displaying screen 1110 displays a hologram image of a plurality of cardiac muscle cells. Among them, a cardiac muscle cell image 510A is an observation target using the hologram 400. The arithmetic operation unit 300 performs a motion analysis process on the hologram 400 of the cardiac muscle cell image 510A. In the cell existence region displaying screen 1120A, an image 511A obtained by reconstructing the hologram 400 of the cardiac muscle cell image 510A is displayed. On the cell existence region displaying screen 1120A, a region where a cell exists (area A) is displayed.

The cell motion region displaying screen 1120B displays a region 511B in which a cell is in motion in the area A in addition to the image 511A corresponding to the area A displayed on the cell existence region displaying screen 1120A.

An analysis result displaying screen 1130 displays a graph showing the movement history of the cardiac muscle cell image 510A. The movement history can be acquired from a motion compensation parameter of a translational component for the cardiac muscle cell image 510A. This makes it possible to evaluate quantitatively a motion in the translation direction of the cardiac muscle cell.

An analysis result displaying screen 1131 displays a graph in which the magnitude of a motion based on the beat of the cardiac muscle cell image 510A and a change in time series of the area for each image is displayed.

On analysis result displaying screens 1132 and 1133, an image for a change in a shape of the cardiac muscle cell image 510A and the scaling factor thereof are displayed. This makes it possible to evaluate quantitatively a motion for the contraction and relaxation of the cardiac muscle cell.

Second Application Example: Analysis Process for Motion of a Plurality of Sperms Then, a second application example is now described. FIG. 21 is a diagram illustrating an example in which the processing result according to the second embodiment is displayed. Referring to FIG. 21, a screen 1200 displayed on the display unit by the display controller 316 includes an original moving image displaying screen 1210, reconstructed image displaying screens 1220A to 1220D, and an analysis result displaying screens 1230 to 1233.

The original moving image displaying screen 1210 displays a hologram image of a plurality of sperms. Among them, sperm images 520A to 520D are selected as a target to be processed in the processing unit 260 by the user's operation or the like. In this case, frames 1211A to 1211D indicating that the sperm images 520A to 520D are selected may be displayed around the sperm images 520A to 520D, respectively.

In this case, the arithmetic operation unit 300 performs on each of the selected sperm images 520A to 520D. On the reconstructed image displaying screens 1220A to 1220D, moving images including sperm images 521A to 521D obtained by reconstructing the hologram are displayed, respectively. As shown in FIG. 21, the display controller 316 may control the direction or the like of each of the reconstructed images so that the sperm images 521A to 521D are the same direction. As one example, the display controller 316 estimates the direction in which each of the sperm images 520A to 520D moves from the magnitude of the motion of the translational component of the sperm images 520A to 520D, and may control a display of each of the motion compensation images so that the estimated moving direction is the direction that is defined in the motion compensation image displaying screens 1220A to 1220D. This makes it possible to compare between the sizes or shapes of the morphology of each of the sperm images 521A to 521D.

On the analysis result displaying screen 1230 and the analysis result displaying screen 1231, a graph showing the movement history and a graph showing the rotation history of the sperm images 520A to 520D are displayed respectively. The movement history can be acquired from a motion compensation parameter of a translational component for the sperm images 520A to 520D. The rotation history can be acquired from a motion compensation parameter of a rotational component for the sperm images 520A to 520D. Thus, it is possible to evaluate quantitatively a motion in the translation direction and rotational direction of the sperm.

On the analysis result displaying screen 1232, a bar graph showing the amount of movement of the sperm images 520A to 520D is displayed. The amount of movement can be acquired from a motion compensation parameter of a translational component for the sperm images 520A to 520D. It is possible to evaluate quantitatively a motion state of the sperm by displaying the amount of movement of each sperm using the bar graph.

On the analysis result displaying screen 1233, a bar graph showing evaluation values of the morphology of the sperm images 521A to 521D is displayed. The evaluation values of the morphology may be an evaluation value calculated from the size or the shape characteristics of the sperm images 520A to 520D, as one example. It is possible to evaluate quantitatively the quality of the sperm morphology by displaying the evaluation value of the morphology of each sperm using the bar graph.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An image processing apparatus including:

a motion detector configured to detect motion of an observation target from a hologram of the observation target;

a hologram processing unit configured to extract a portion of the hologram based on a result obtained by detecting the motion of the observation target; and a reconstruction unit configured to reconstruct an image from a portion of the extracted hologram.

(2)

The image processing apparatus according to (1), wherein the hologram includes a plurality of frames acquired at different points in time, and the hologram processing unit extracts a portion from the plurality of frames based on the detection result.

(3)

The image processing apparatus according to (2), wherein the hologram processing unit extracts two frames from the plurality of frames, the two frames each having an amount of displacement different from each other for the observation target.

(4)

The image processing apparatus according to (3), wherein the hologram processing unit extracts a frame having a maximum amount of displacement and a frame having a minimum amount of displacement.

(5)

The image processing apparatus according to (4), further including:

a block matching unit configured to determine whether a first image block in the frame having the maximum amount of displacement matches a second image block in the frame having the minimum amount of displacement, the second image block corresponding, in position, to the first image block;

a motion region specifying unit configured to, when the first image block and the second image block fail to match based on the determination result, specify a region corresponding to the first image block and the second image block as a motion region of the observation target; and a ratio calculation unit configured to calculate a ratio of the motion region to a region in which the observation target exists.

(6)

The image processing apparatus according to (5), further including:

an existence region specifying unit configured to specify the region in which the observation target exists based on a luminance difference in the first image block or the second image block.

(7)

The image processing apparatus according to (5), further including:

an existence region extracting unit configured to specify the region in which the observation target exists based on user operation information.

(8)

The image processing apparatus according to (1), wherein the hologram processing unit extracts a portion of a planar region of the hologram based on the detection result.

(9)

The image processing apparatus according to (8), further including:

a counter configured to count the observation target coincident with a predetermined shape from the hologram, wherein the hologram processing unit extracts a hologram of the observation target having no motion, the observation target being coincident with the predetermined shape from a planar region of the hologram, the reconstruction unit reconstructs an image from the hologram of the observation target having no motion, and the counter excludes a number of unnecessary objects obtained from the image acquired by the reconstruction from a number of counts.

(10)

The image processing apparatus according to (8), wherein the hologram processing unit extracts a region of the observation target having motion from the planar region of the hologram.

(11)

The image processing apparatus according to any one of (1) to (10), wherein the observation target is an object derived from a living body.

(12)

A method of image processing, the method including:

detecting motion of an observation target from a hologram of the observation target;

extracting a portion of the hologram based on a result obtained by detecting the motion of the observation target; and reconstructing an image from a portion of the extracted hologram.

(13)

An image processing system including:

a light source configured to emit partial coherence light to an observation target;

an image sensor configured to detect a hologram by interference between transmitted light and diffracted light obtained by separating the partial coherence light by the observation target;

a motion detector configured to detect motion of the observation target from the hologram;

a hologram processing unit configured to extract a portion of the hologram based on a result obtained by detecting the motion of the observation target; and a reconstruction unit configured to reconstruct an image from a portion of the extracted hologram.

REFERENCE SIGNS LIST 300 arithmetic operation unit
302 hologram processing unit
302b motion detector
302c hologram extraction unit
308 reconstruction unit
312 motion region specifying unit
312a block matching unit
312b ratio calculation unit
314 existence region specifying unit

The invention claimed is:

1. An image processing apparatus, comprising:
an image processing device configured to:
receive a hologram of an observation target containing at least one biological specimen;
detect a motion type of a first biological specimen, from the hologram of the observation target;
extract a portion of the hologram based at least on the detected motion type of the first biological specimen; and
reconstruct an image of the first biological specimen from the portion of the hologram, wherein the portion corresponds to a specific frame acquired at a specific time.

2. The image processing apparatus according to claim 1, wherein the portion of the hologram is extracted based on a type of the first biological specimen.

3. The image processing apparatus according to claim 1, wherein the motion type is periodic motion.

4. The image processing apparatus according to claim 1, wherein the image processing device is further configured to:
receive a plurality of holograms corresponding to a plurality of frames acquired at different points in time; and
extract at least one portion from the plurality of holograms based on the detected motion type.

5. The image processing apparatus according to claim 4, wherein the image processing device is further configured to:
extract two holograms from the plurality of holograms, wherein
each hologram of the two holograms has an amount of displacement for the first biological specimen, and
the amount of displacement of each hologram, of the two holograms, is different from each other.

6. The image processing apparatus according to claim 5, wherein the image processing device is further configured to extract a first hologram having a maximum amount of displacement for the first biological specimen, and a second hologram having a minimum amount of displacement for the first biological specimen.

7. The image processing apparatus according to claim 6, further comprising:
a block matching unit configured to determine whether a first image block in the first hologram having the maximum amount of displacement matches with a second image block in the second hologram having the minimum amount of displacement, wherein a position of the second image block corresponds to a position of the first image block;
a motion region specifying unit configured to specify, when the first image block and the second image block fail to match, a region corresponding to the first image block and the second image block, wherein the region is specified as a motion region of the first biological specimen; and a ratio calculation unit configured to calculate a ratio of an area of the motion region to an area of a region in which the first biological specimen exists.

8. The image processing apparatus according to claim 7, further comprising an existence region specifying unit configured to specify the region in which the first biological specimen exists based on a luminance difference in one of the first image block or the second image block.

9. The image processing apparatus according to claim 7, further comprising an existence region specifying unit configured to specify the region in which the first biological specimen exists, based on user operation information.

10. The image processing apparatus according to claim 1, wherein the image processing device is further configured to extract a planar region of the hologram.

11. The image processing apparatus according to claim 10, further comprising:
a counter configured to:
count the first biological specimen which is coincident with a specific shape from the hologram, wherein the image processing device is configured to:
extract the portion of the hologram for the first biological specimen having no motion, wherein the first biological specimen is coincident with the specific shape from the planar region of the hologram; and
reconstruct the image from the portion of the hologram for the first biological specimen having no motion, and
the counter excludes a plurality of objects in the reconstructed image from the count.

12. The image processing apparatus according to claim 10, wherein the detected motion type indicates motion of the first biological specimen.

13. The image processing apparatus according to claim 1, wherein the motion type is random motion.

14. The image processing apparatus according to claim 1, wherein the image processing device is further configured to:
extract stationary portion of the hologram, wherein the extracted stationary portion has a stationary motion characteristic; and
reconstruct an image of a second biological specimen from the stationary portion of the hologram.

15. The image processing apparatus according to claim 1, wherein the image processing device is further configured to:
extract at least one in motion portion from the hologram; and
reconstruct at least one image from the at least one in motion portion.

16. The image processing apparatus according to claim 1, wherein the image processing device comprises:
a hologram processor configured to receive hologram signals from a sensor located near the observation target; and
a motion sensor configured to detect motion of the first biological specimen from the received hologram signals.

17. A method of lens free image processing of biological specimens, the method comprising:
receiving a hologram of an observation target containing at least one biological specimen;
detecting a motion type of a biological specimen, from the hologram of the observation target;
extracting a portion of the hologram based on the detected motion type; and
reconstructing an image of the biological specimen from the extracted portion of the hologram, wherein the portion corresponds to a specific frame acquired at a specific time.

18. An image processing system, comprising:
a light source configured to emit partial coherence light to illuminate an observation target containing at least one biological specimen;
an image sensor configured to detect a hologram produced by interference between transmitted light and diffracted light from the observation target;
a motion detector configured to detect a motion type of a biological specimen in the hologram;
a hologram processing unit configured to extract a portion of the hologram based on the detected motion type; and
a reconstruction unit configured to reconstruct an image of the biological specimen from the extracted portion of the hologram, wherein the extracted portion corresponds to a specific frame acquired at a specific time.

19. An image processing apparatus, comprising:
an image processing device configured to:
receive a hologram of an observation target containing at least one biological specimen;
detect a motion type of a biological specimen, from the hologram of the observation target;
extract a portion of the hologram based at least on the detected motion type of the biological specimen;
receive a plurality of holograms corresponding to a plurality of frames acquired at different points in time;
extract at least one portion from the plurality of holograms based on the detected motion type of the biological specimen;
extract two holograms from the plurality of holograms, wherein
each hologram of the two holograms has an amount of displacement for the biological specimen, and
the amount of displacement of each hologram, of the two holograms, is different from each other; and
extract a first hologram having a maximum amount of displacement for the biological specimen, and a second hologram having a minimum amount of displacement for the biological specimen.

20. An image processing apparatus, comprising:
an image processing device configured to:
receive a hologram of an observation target containing at least one biological specimen;
detect a motion type of a biological specimen, from the hologram of the observation target;
extract a planar region of the hologram;
extract a portion of the hologram based at least on the detected motion type of the biological specimen, wherein
the portion of the hologram is extracted for the biological specimen having no motion, and
the biological specimen is coincident with a specific shape from the planar region of the hologram; and
reconstruct an image from the portion of the hologram for the biological specimen having no motion; and a counter configured to:
   count the biological specimen which is coincident with the specific shape from the hologram; and
   exclude a plurality of objects in the reconstructed image from the count.

\* \* \* \* \*